United States Patent [19]

Sakai et al.

[11] Patent Number: 4,869,659

[45] Date of Patent: Sep. 26, 1989

[54] TOGGLE-TYPE DIE-FASTENING APPARATUS

[75] Inventors: Seiya Sakai; Mitsuo Suzuki, both of Chiba; Toshiro Saito, Yotsukaido, all of Japan

[73] Assignee: Sumitomo Heavy Industries, Ltd., Tokyo, Japan

[21] Appl. No.: 211,535

[22] PCT Filed: Sep. 29, 1987

[86] PCT No.: PCT/JP87/00709

§ 371 Date: May 25, 1988

§ 102(e) Date: May 25, 1988

[87] PCT Pub. No.: WO89/02817

PCT Pub. Date: Apr. 6, 1989

[51] Int. Cl.⁴ .................. B29C 43/58; B29C 45/76
[52] U.S. Cl. ............................. 425/135; 72/6;
  72/19; 72/451; 100/50; 100/272; 425/149;
  425/451.6; 425/593
[58] Field of Search ............... 72/6, 19, 450, 451;
  100/272, 286, 50; 425/146, 149, 451.5, 451.6,
  592, 593, 595

[56] References Cited

U.S. PATENT DOCUMENTS

| | | | |
|---|---|---|---|
| 3,606,641 | 9/1971 | Carrieri et al. | 425/595 |
| 3,669,599 | 6/1972 | Snider et al. | 425/595 |
| 3,734,673 | 5/1973 | Paterson et al. | 425/451.6 |
| 3,819,774 | 6/1974 | Eggenberger et al. | 264/40.5 |
| 4,059,383 | 11/1977 | Tsutsumi | 425/451.6 |
| 4,281,977 | 8/1981 | Farrell | 264/40.5 |
| 4,301,100 | 11/1981 | Farrell | 264/40.5 |
| 4,685,876 | 8/1987 | Loscei | 425/495 |

FOREIGN PATENT DOCUMENTS 56-25429 3/1981 Japan.
56-135 6/1981 Japan.
59-29355 7/1984 Japan.

Primary Examiner—Willard Hoag
Attorney, Agent, or Firm—Armstrong, Nikaido, Marmelstein, Kubovcik & Murray

[57] ABSTRACT

A toggle-type die-fastening apparatus has a movable platen that carries one mold part and is supported by and guided along a plurality of tie bars whose one ends are fixed to a fixed platen on which another mold part is mounted. The other ends of the tie bars are supported by a toggle support, and a toggle mechanism is disposed between the toggle support and the movable platen for pressing the mold part carried by the movable platen against the mold part mounted on the fixed platen. A die-fastening force adjusting nut is threaded onto the end portion of each tie bar that is closer to the toggle support so as to bear the reaction of the die-fastening force generated by the toggle mechanism. An adjusting cylinder is formed in this portion, and it is connected to a hydraulic circuit so that the pressure within each of the cylinders is controlled by a pressure adjusting valve in such a manner as to correspond to a die-fastening force set by a setting device. Therefore, the die-fastening forces of all the tie bars can be made the same, thereby eliminating any imbalance between the die-fastening forces of the tie bars caused by changes in thermal balance during the operation of the molding machine.

4 Claims, 4 Drawing Sheets

TOGGLE-TYPE DIE-FASTENING APPARATUS

DESCRIPTION

1. Technical Field The present invention relates to a toggle-type die-fastening apparatus of an injection molding machine.

2. Background Art

As shown in FIGS. 1 and 2, a conventional toggle-type die-fastening apparatus of an injection molding machine has the following construction. A die-fastening force adjusting nut 1 registers with a toggle support 4 and is threaded onto the end portion of a corresponding tie bar 3 that is closer to the toggle support 4. Two pairs of links 17, each pair comprising two links, are linked to one another in such a manner that the two pairs are symmetrical with respect to a die-fastening cylinder 16 therebetween. The links 17 are disposed between the toggle support 4 and a movable platen 15 so that the support 4 and the platen 15 are connected to each other through the links 17. Further, a cross head 18 is mounted on the tip of a rod of the die-fastening cylinder 16 and is connected to one link 17 of each link pair through further links 19. With this construction, the die-fastening force adjusting nut 1 is adjusted by being rotated via a gear 20 in order to set a die-fastening force, so that, when the rod of the die-fastening cylinder 16 is extended, the movable platen 15 advances along the tie bars 3, and, when the tie bars 3 are extended, a predetermined die-fastening force can be provided at the front end of the advanced platen 15 as the reaction of a cylinder force which has been amplified by the toggle mechanism 17, 18, and 19.

The conventional apparatus, however, has the following problem. During the operation of the molding machine, if the thermal balance in the molding machine changes, various parts of the machine, including the components of the toggle, become expanded or contracted. In consequence, the die-fastening force of the toggle tends to be slightly varied between the tie bars, making it difficult for the toggle to apply a constant die-fastening force uniformly over the entire mold. Accordingly, the conventional apparatus is not suitable for use in forming high-precision products such as disks, because dimensions of such products must be determined to a very high precision.

The present invention has been accomplished to eliminate this problem of the prior art. An object of the present invention is to provide a toggle-type die-fastening apparatus which is capable of applying the necessary die-fastening force uniformly over an entire mold.

DISCLOSURE OF INVENTION

According to the present invention, there is provided a toggle-type die-fastening apparatus having a plurality of tie bars which are each fixed at one end thereof to a fixed platen and which axially slidably support a movable platen, a toggle support having holes through which the other ends of the tie bars are inserted so as to be supported by the toggle support, die-fastening force adjusting nuts which are threaded onto the other ends of the tie bars and which register with the outer surface of the toggle support, and a toggle mechanism disposed between the movable platen and the toggle support for pressing the movable platen against the fixed platen. The apparatus is characterized by comprising: adjusting cylinders which are each formed by enlarging a corresponding hole in the toggle support on the side thereof on which the adjusting nuts register with the toggle support; pistons slidably disposed within the adjusting cylinders and being capable of pressing against the corresponding adjusting nuts in the direction in which the corresponding tie bars are acted on by tensile forces; a hydraulic circuit for supplying hydraulic pressure to the adjusting cylinders; a pressure adjusting valve provided in the hydraulic circuit for adjusting the pressure within the adjusting cylinders; and a setting device for setting a die-fastening force, wherein the pressure adjusting valve is controlled in accordance with signals from the setting device.

By virtue of the provision of the adjusting cylinders, the toggle-type die-fastening apparatus in accordance with the present invention is capable of equalizing the tensile forces acting on the tie bars, thereby enabling compensation for small fluctuations in the die fastening force due to thermal influences.

BEST MODE FOR CARRYING OUT THE INVENTION

Figure 1:
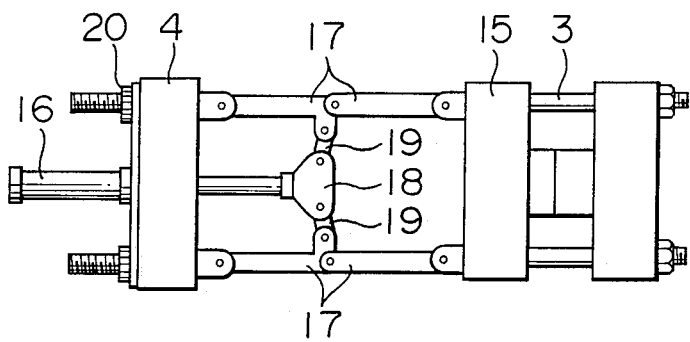
FIG. 1 is a plan view of the entire structure of a conventional toggle-type die-fastening apparatus.
Figure 2:
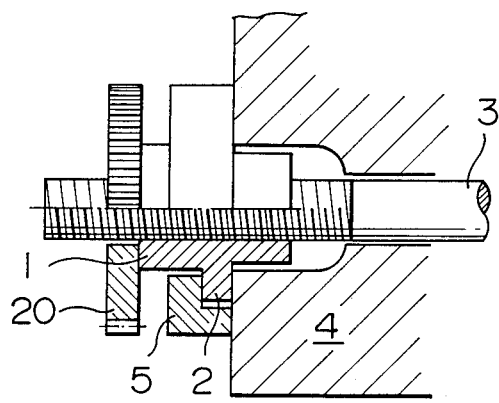
FIG. 2 is an enlarged, partially sectioned view of essential parts of the apparatus shown in FIG. 1.

One embodiment of the present invention will be described hereunder with reference to FIG. 3.

An apparatus in accordance with this embodiment has a plurality of die-fastening force adjusting nuts 1, a plurality of tie bars 3, and a toggle support 4. Each nut 1 has a stopping flange 2 formed around the circumference of an intermediate portion thereof. The nut 1 is threaded onto the end portion of the corresponding tie bar 3 that is closer to the toggle support 4, and the nut 1 is rotatably mounted while it is prevented from dropping off from the toggle support 4 by a stopper 5 secured to the toggle support 4.

Reference numeral 6 denotes a cylinder chamber which is a recess formed around the die-fastening force adjusting nut 1, coaxially therewith. A ring-shaped piston 7 is slidably fitted on the die-fastening force adjusting nut 1 and is slidably fitted in the cylinder chamber 6, thereby forming an adjusting cylinder 8. The piston 7 may alternatively be a part of a member formed integrally with the adjusting nut 1, such as the stopping flange 2.

Reference numeral 9 denotes a hydraulic circuit connecting the adjusting cylinder 8 to a hydraulic pump 10, so that, when hydraulic pressure is supplied from the hydraulic pump 10, the pressure acts on the piston 7 to press the piston 7 against the nut 1 in the direction in which the tie bar 3 is expanded. In this way, it is possible to adjust the tensile force (a die fastening force) acting on the tie bar 3 through the die-fastening force adjusting nut 1.

Reference numeral 11 denotes a pressure detector which is provided in the hydraulic circuit 9 and is connected to a comparator 12. The pressure detector 11 detects the pressure within the adjusting cylinder 8 and outputs the detected pressure to the comparator 12.

Reference numeral 13 denotes a pressure adjusting valve, such as a servo valve, which is also provided in the hydraulic circuit 9. The pressure adjusting valve 13 is connected to the comparator 12 which compares the actual value of the die-fastening force input rom the pressure detector 11 with a set value of the die-fastening force input from a setting device 14, and the pressure adjusting valve 13 is controlled in such a manner that the actual value of the die-fastening force falls within an allowable range of the set value.

One each of the pressure detector 11 and the pressure adjusting valve 13 may be provided for each of the adjusting cylinders 8. However, the same effect can be achieved if one each of the pressure detector 11 and the pressure adjusting valve 13 is provided in common for all the adjusting cylinders 8, for setting the die-fastening force.

If the die-fastening force required for each stage of a die-clamping or die-opening process is set in the setting device 14, it is possible to control the pressure adjusting valve 13 in accordance with output signals from the comparator 12 for each of intervals between positions of the movable platen 15 which are simultaneously detected by an LS or encoder, so that all the adjusting cylinders 8 have the same necessary internal pressure. As a result, the tie bars 3, which are expanded or contracted by operation of the corresponding cylinders 8, are acted upon by a constant tensile force (die-fastening force).

Figure 3:
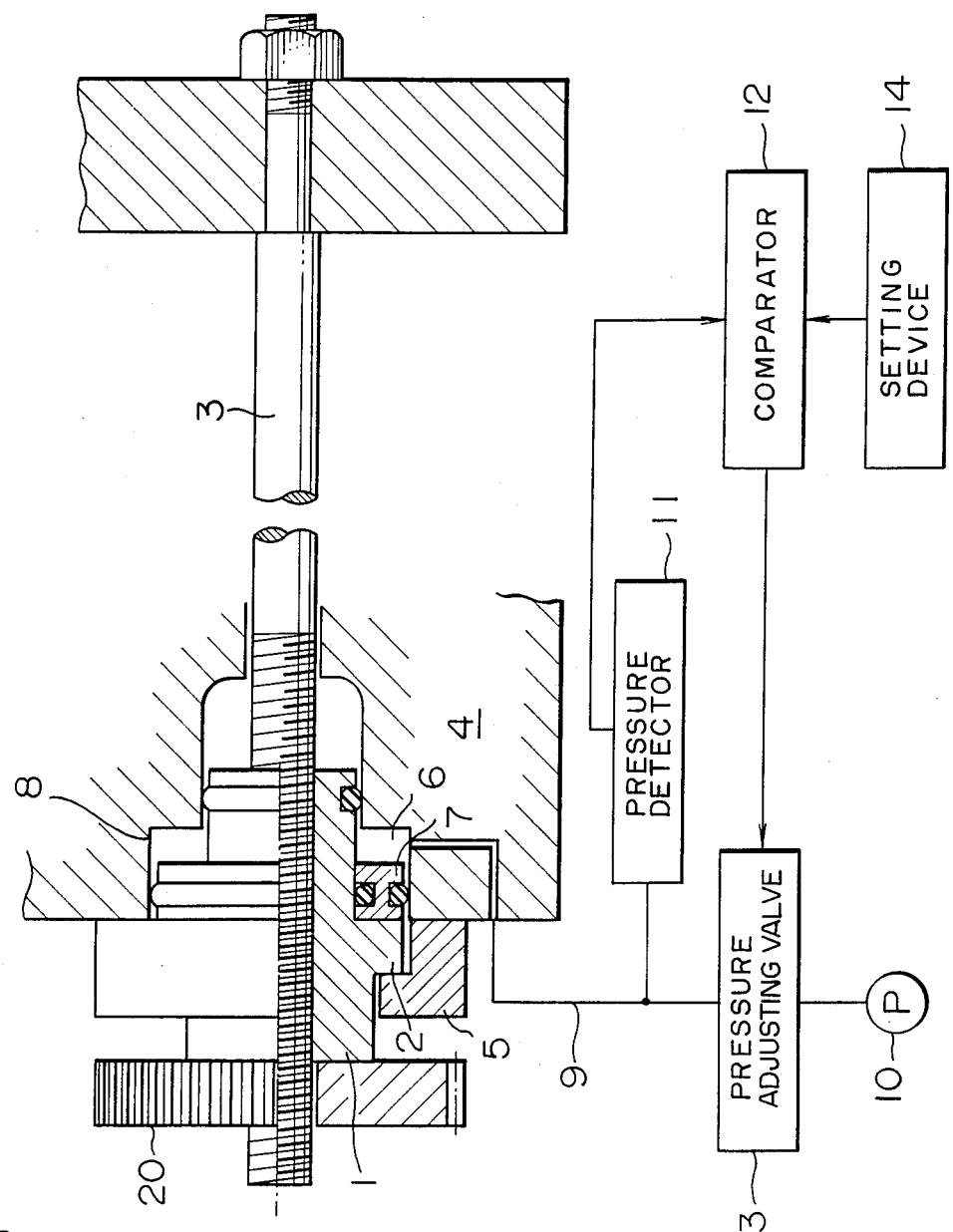
FIG. 3 is a schematic illustration of one embodiment of the present invention, in which essential parts of an apparatus in accordance with the embodiment are shown enlarged and partially sectioned.
Figure 4:
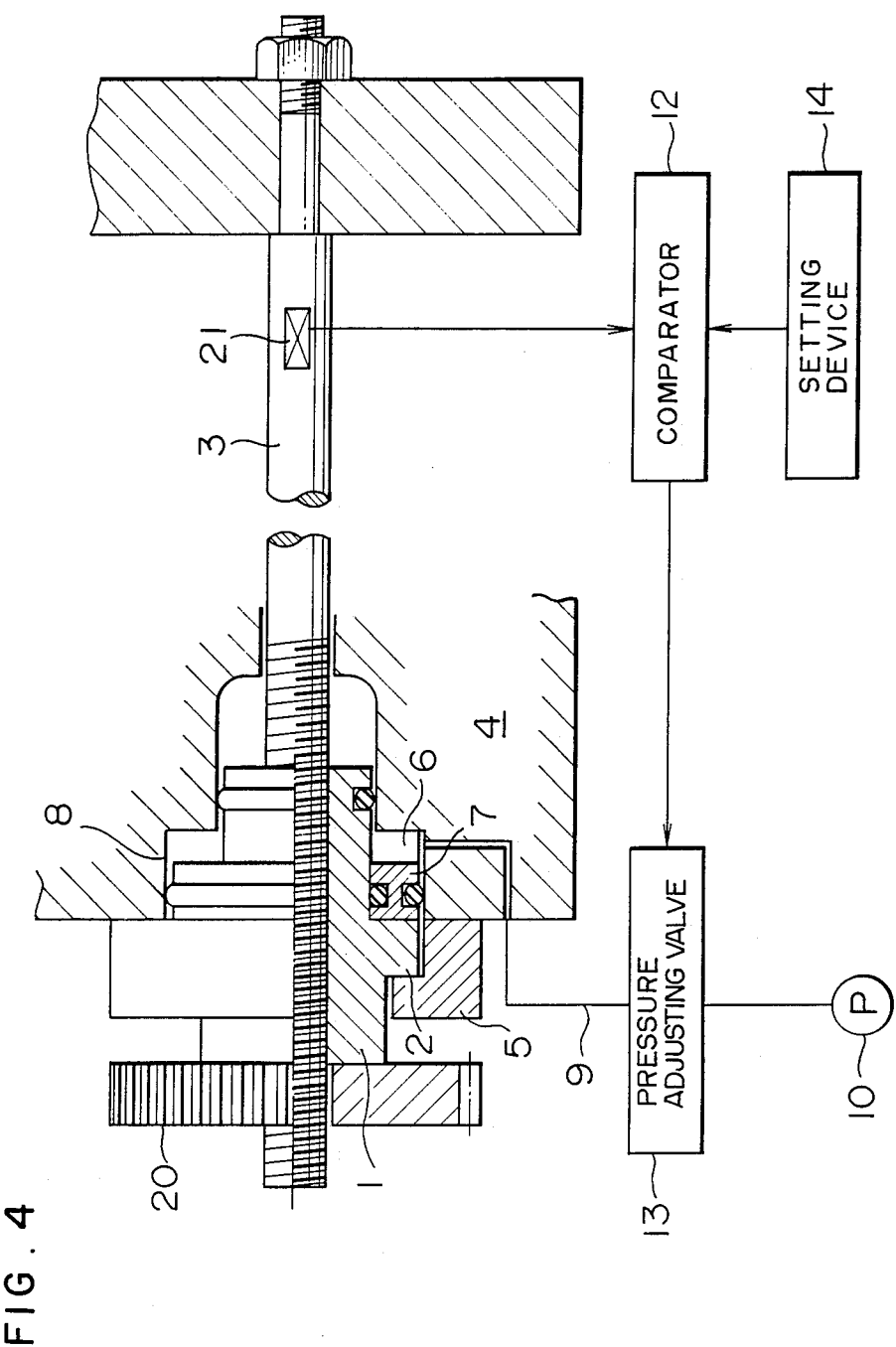
FIGS. 4 and 5 are schematic illustrations of other embodiments of the present invention, respectively, in which essential parts of the corresponding apparatus are shown enlarged and partially sectioned.

In the embodiment illustrated in FIG. 3, the tensile force acting on the tie bars 3 is detected indirectly by a pressure detector 11 which detects the pressure within the adjusting cylinder 8. Another embodiment illustrated in FIG. 4 is distinguished from the previous embodiment in that the tensile force acting on each of the tie bars 3 is directly detected by a die-fastening force detector 21, such as a strain gauge or gap sensor, which is provided on the corresponding tie bar 3. The remaining arrangement of the apparatus in accordance with this embodiment is similar to that shown in FIG. 3. That is, the actual value of the tensile force, i.e., the die-fastening force, acting on each tie bar 3 is detected by the detector 21 and is input to the comparator 12 in which the actual value is compared with a set value of the die-fastening force input from the setting device 14, and the pressure adjusting valve 13 is controlled in such a manner that the actual value falls within an allowable range of the set value.

Figure 5:
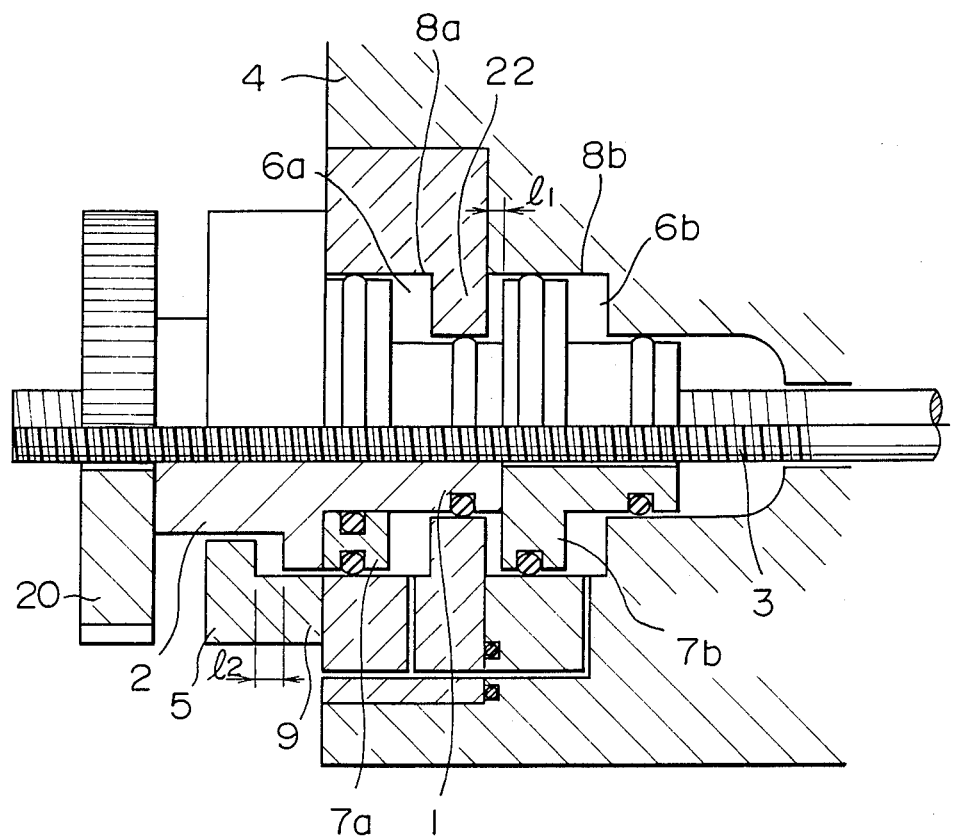

FIG. 5 illustrates a further embodiment of the present invention in which each of the tie bars 3 is provided with a plurality of pistons 7a and 7b and in which adjusting cylinders 8a and 8b are provided in the toggle support 4 in correspondence with the pistons 7a and 7b.

In this embodiment, the first and second pistons 7a and 7b are fittingly received in first and second cylinder chambers 6a and 6b, respectively, which are partially defined by a piston receiving wall 22.

A stroke l1 of the second piston 7b until it abuts against the piston receiving wall 22 and a stroke l2 of the first piston 7a until it abuts against the piston receiving wall 22 are in the following relationship:

$$l1 < l2$$

Needless to say, in this embodiment illustrated in FIG. 5, a control device connected downstream of the hydraulic circuit 9 may be either the control device shown in FIG. 3 or that shown in FIG. 4, as desired.

As described above, the toggle-type die-fastening apparatus in accordance with the present invention is provided with adjusting cylinders formed between die-fastening force adjusting nuts and a toggle support. The cylinders are used to provide feedback control of the die-fastening force acting on each of the tie bars, in such a manner that the die-fastening force is kept constant. Therefore, small fluctuations of the die-fastening force due to thermal influences can be compensated for and a constant die-fastening force can be provided. This enables accurate manufacture of high-precision products such as disks.

INDUSTRIAL APPLICABILITY

The apparatus in accordance with the present invention may be used as a die-fastening apparatus of an injection molding machine in which a pair of mold parts are clamped between a fixed platen and a movable platen, and the apparatus may be advantageously be applied to the injection molding of high-precision products.

What is claimed is:

1. A toggle-type die-fastening apparatus having a plurality of tie bars which are each fixed at one end thereof to a fixed platen and which axially slidably support a movable platen, a toggle support having holes through which other ends of said tie bars are inserted so as to be supported by said toggle support, die-fastening force adjusting nuts which are threaded onto the other ends of said tie bars and which register with an outer surface of said toggle support, and a toggle mechanism disposed between said movable platen and said toggle support for pressing said movable platen against said fixed platen, said apparatus comprising:

adjusting cylinders which are each formed by enlarging a corresponding hole in said toggle support on a side thereof on which said adjusting nuts register with said toggle support;

pistons slidably disposed within said adjusting cylinders and being capable of pressing against the corresponding adjusting nuts in a direction in which the corresponding tie bars are acted on by tensile forces;

a hydraulic circuit for supplying hydraulic pressure to said adjusting cylinders;

a pressure adjusting valve provided in said hydraulic circuit for adjusting the hydraulic pressure within said adjusting cylinders; and a setting device for setting a die-fastening force, wherein said pressure adjusting valve is controlled in accordance with signals from said setting device.

2. A toggle-type die-fastening apparatus according to claim 1, wherein each of said adjusting cylinders comprises a plurality of adjusting cylinder members, each of said adjusting cylinder members receiving a piston capable of pressing the corresponding adjusting nut in the direction in which the corresponding tie bar is acted on by a tensile force.

3. A toggle-type die-fastening apparatus according to any one of claims 1 or 2, further comprising:

a pressure detector for detecting the pressure within said adjusting cylinders; and a comparator for comparing a value detected by said pressure detector with a set value of the die-fastening force set by said setting device, wherein said pressure adjusting valve is controlled in accordance with signals output from said comparator.

4. A toggle-type die-fastening apparatus according to any one of claims 1 or 2, further comprising:
   a detector for detecting a tensile force acting on each tie bar; and
   a comparator for comparing a value detected by said detector with a set value of the die-fastening force set by said setting device,
   wherein said pressure adjusting valve is controlled in accordance with signals output from said comparator.

* * * * *